United States Patent
Morris et al.

(10) Patent No.: US 9,308,799 B2
(45) Date of Patent: Apr. 12, 2016

(54) VARIABLE EVAPORATOR OUTLET AIR PRESSURE DISTRIBUTION

(75) Inventors: William Morris, Farmington Hills, MI (US); Delomer Gosioco, Royal Oak, MI (US); Hiromitsu Maehata, Nagoya (JP); David Korenchuk, Royal Oak, MI (US)

(73) Assignee: Denso International America, Inc., Southfield, MI (US)

(*) Notice: Subject to any disclaimer, the term of this patent is extended or adjusted under 35 U.S.C. 154(b) by 884 days.

(21) Appl. No.: 13/160,816

(22) Filed: Jun. 15, 2011

(65) Prior Publication Data

US 2012/0247714 A1    Oct. 4, 2012

Related U.S. Application Data

(60) Provisional application No. 61/468,995, filed on Mar. 29, 2011.

(51) Int. Cl.
*B60H 1/00* (2006.01)

(52) U.S. Cl.
CPC ........ *B60H 1/00064* (2013.01); *B60H 1/00828* (2013.01); *B60H 2001/00099* (2013.01)

(58) Field of Classification Search
CPC ........... B60H 1/00007; B60H 1/00835; B60H 1/00842; B60H 1/3207; B60H 1/00064; B60H 1/00021; B60H 1/00828; B60H 1/00892; B60H 1/345

USPC ............ 165/202, 203, 204, 244, 42, 96, 103, 165/122

See application file for complete search history.

(56) References Cited

U.S. PATENT DOCUMENTS

| | | | | |
|---|---|---|---|---|
| 5,135,046 | A * | 8/1992 | Becquerel et al. | 165/43 |
| 6,135,201 | A * | 10/2000 | Nonoyama et al. | 165/202 |
| 6,422,309 | B2 * | 7/2002 | Vincent | 165/204 |
| 6,983,793 | B2 * | 1/2006 | Zheng et al. | 165/203 |
| 8,267,165 | B2 * | 9/2012 | Nanaumi et al. | 165/202 |

FOREIGN PATENT DOCUMENTS

| | | |
|---|---|---|
| JP | 06-143996 | 5/1994 |
| JP | 07-285328 | 10/1995 |
| JP | 10-016539 | 1/1998 |

OTHER PUBLICATIONS

Office Action dated Mar. 11, 2014 in the corresponding JP Application No. 2012-074383 with English translation.

\* cited by examiner

*Primary Examiner* — Travis Ruby
(74) *Attorney, Agent, or Firm* — Harness, Dickey & Pierce, P.L.C.

(57) ABSTRACT

A climate control system for a vehicle having a plurality of modes includes an evaporator having a downstream face. The system also includes at least one blower that blows air across the evaporator. The air downstream of the blower has a pressure distribution defined generally along the downstream face. The pressure distribution along the downstream face is variable depending on which of the plurality of modes the climate control system is currently set.

7 Claims, 5 Drawing Sheets

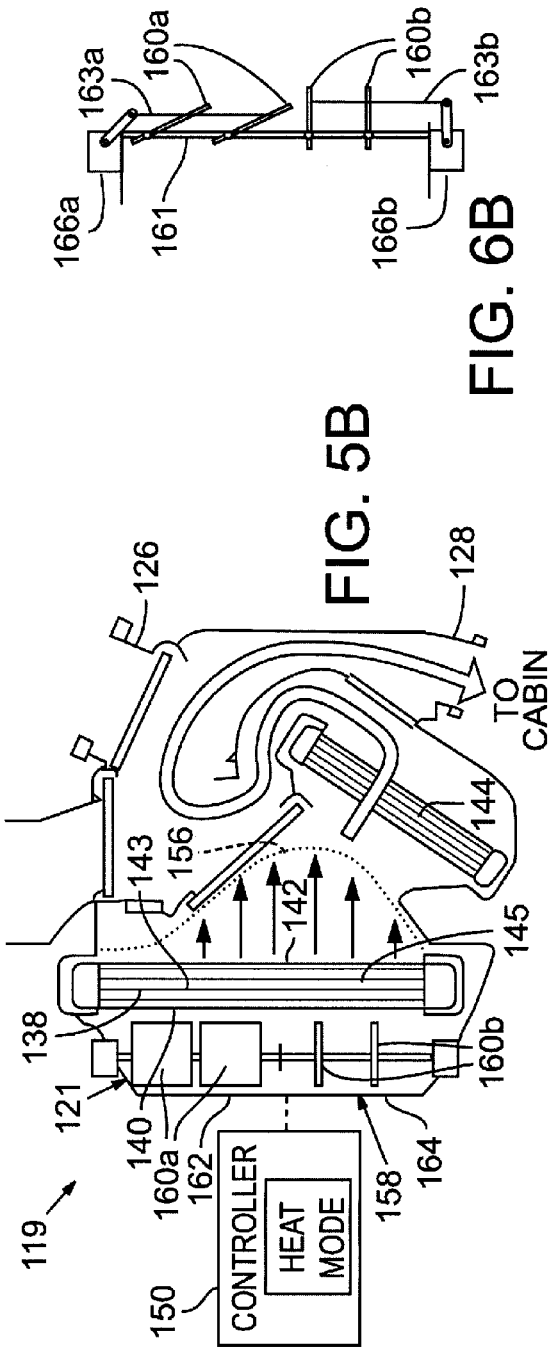
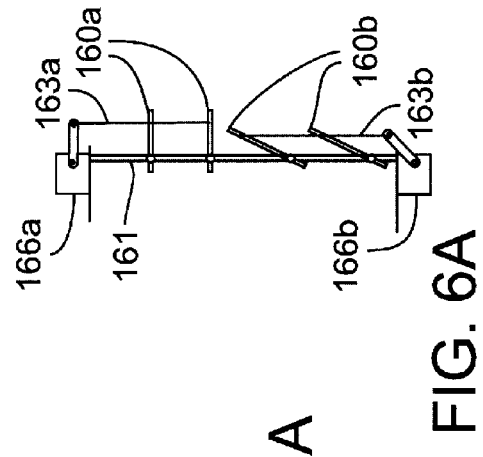
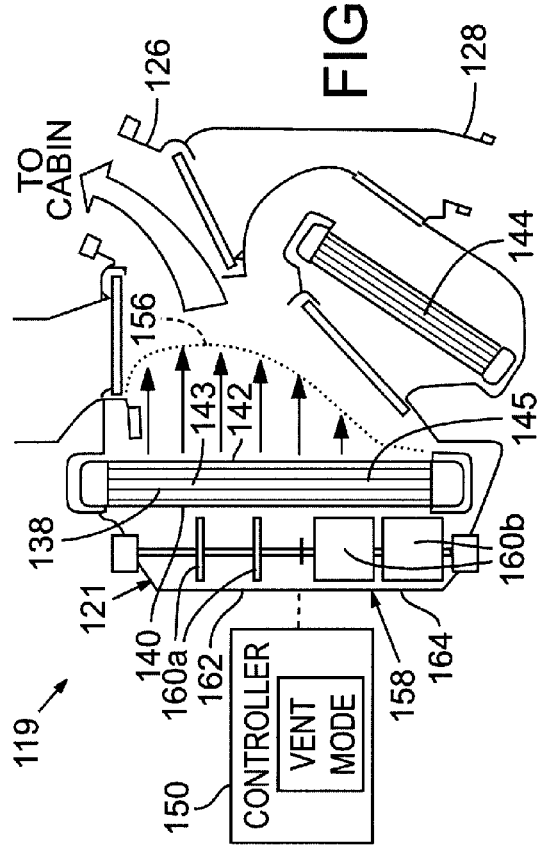
FIG. 5A
FIG. 5B
FIG. 6A
FIG. 6B ously to U.S. Provisional
VARIABLE EVAPORATOR OUTLET AIR PRESSURE DISTRIBUTION

CROSS-REFERENCE TO RELATED APPLICATIONS

This application claims the benefit of U.S. Provisional Application No. 61/468,995, filed on Mar. 29, 2011, the disclosure of which is incorporated herein by reference in its entirety.

FIELD

The present disclosure relates to a climate control system and, more particularly, relates to a climate control system configured for variable evaporator outlet air pressure distribution.

BACKGROUND

This section provides background information related to the present disclosure which is not necessarily prior art.

Vehicles have been equipped with air conditioning systems (HVAC systems, climate control systems, etc.) for many years. Typically, these systems include a cooling cycle with an evaporator, condenser, compressor, etc., and refrigerant flows through the cooling cycle and changes temperature through the cycle. Air can flow over an evaporator of the cooling cycle to be chilled, and this chilled air can be delivered to the passenger cabin to thereby cool the passenger cabin.

Also, these HVAC systems can include a heater core that is heated by the vehicle engine. Air can flow over the heater core to be heated, and this heated air can be delivered to the passenger cabin to thereby heat the passenger cabin.

SUMMARY

This section provides a general summary of the disclosure, and is not a comprehensive disclosure of its full scope or all of its features.

A climate control system for a vehicle having a plurality of modes is disclosed. The climate control system includes an evaporator having a downstream face. The system also includes at least one blower that blows air across the evaporator. The air downstream of the blower has a pressure distribution defined generally along the downstream face. The pressure distribution along the downstream face is variable depending on which of the plurality of modes the climate control system is currently set.

A method of operating a climate control system having a plurality of modes is also disclosed. The method includes blowing air from at least one blower across an evaporator to define a pressure distribution of the air generally along a downstream face of the evaporator. The method also includes varying the pressure distribution along the downstream face depending on which of the plurality of modes the climate control system is currently set.

Furthermore, a climate control system for a vehicle having a vent mode and a heat mode is disclosed. The system includes a ducting assembly defining a first airflow path and a second airflow path. Each of the first and second airflow paths feed into a passenger cabin of the vehicle. The system also includes an evaporator having an upstream face, a downstream face, a first longitudinal region that is disposed generally in the first airflow path, and a second longitudinal region that is disposed generally in the second airflow path. The system additionally includes a heater core disposed generally within the second airflow path. The first airflow path bypasses the heater core. Moreover, the system includes at least one blower that blows air across the evaporator from the upstream face to the downstream face to flow through at least one of the first and second airflow paths. The air downstream of the at least one blower has a pressure distribution defined generally along the downstream face. Additionally, the system includes a controller that controls at least one of the ducting assembly and the at least one blower to vary the pressure distribution along the downstream face, depending on which of the plurality of modes the climate control system is currently set.

Additionally, a climate control system for a vehicle having a plurality of modes is disclosed. The climate control system includes an evaporator having a downstream face and at least one blower that blows air across the evaporator. The air downstream of the blower has a pressure distribution defined generally along the downstream face. Moreover, the system includes a means for varying the pressure distribution along the downstream face depending on which of the plurality of modes the climate control system is currently set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A is a schematic sectional view of the climate control system of FIG. 4 shown in a vent mode;

FIG. 5B is a schematic sectional view of the climate control system of FIG. 4 shown in a heat mode;

FIG. 6A is a schematic end view of blocking members of the climate control system of FIG. 5A shown in a vent mode;

FIG. 6B is a schematic end view of blocking members of the climate control system of FIG. 5B shown in a vent mode;

Corresponding reference numerals indicate corresponding parts throughout the several views of the drawings.

DETAILED DESCRIPTION

Example embodiments will now be described more fully with reference to the accompanying drawings.

Figure 1:
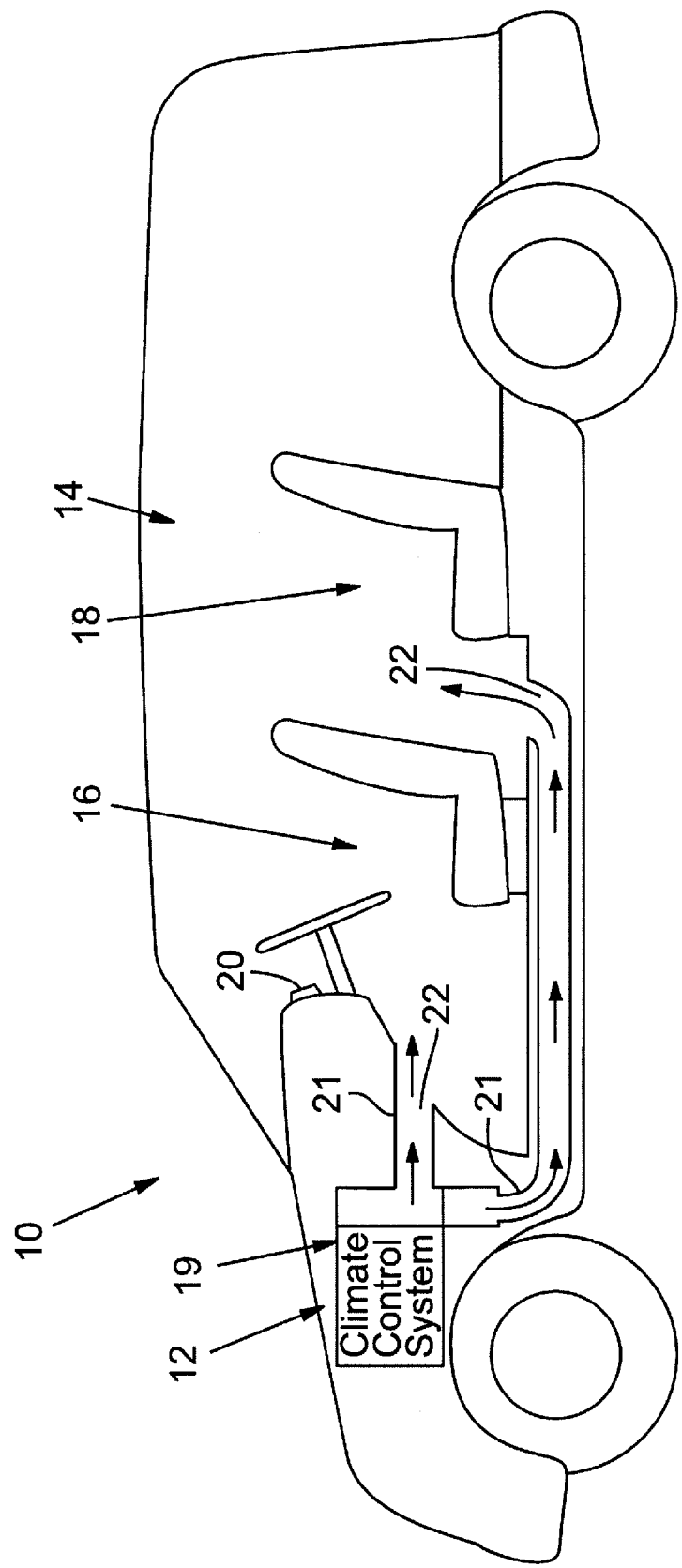
FIG. 1 is a schematic illustration of a vehicle with a climate control system of the present disclosure.

Referring initially to FIG. 1, a vehicle 10 is illustrated. The vehicle 10 can be of any suitable type. For instance, in the embodiment shown, the vehicle 10 is relatively large, such as a van, a minivan, or a sports-utility vehicle (SUV). The vehicle 10 can include an engine compartment 12 and a passenger compartment 14. The passenger compartment 14 can include a front cabin area 16 (i.e., a first cabin area) and a rear cabin area 18 (i.e., a second cabin area). The front and rear cabin areas 16, 18 can each include respective seating areas for passengers. Also, the rear cabin area 18 can include one or more cargo areas.

The vehicle 10 can include a climate control system 19 suitable for adjusting air temperature within the passenger compartment 14. The climate control system 19 can have various components, which will be discussed in detail below, for delivering heated or chilled air into the passenger compartment 14. The system 19 can include a ducting assembly 21 with various air outlets 22. The air outlets 22 can be configured to deliver air to the front cabin area 16, the rear cabin area 18, to a windshield, to footwells, or any other area of the passenger compartment 14. Other portions of the climate control system 19 can be located primarily within the engine compartment 12; however, the climate control system 19 can be located anywhere within the vehicle 10.

The climate control system 19 can have various modes, such as a VENT mode for delivering chilled air to the passenger compartment 14 or, at least, for providing fresh air from outside the vehicle 10 to the passenger compartment 14. The climate control system 19 can also have a HEAT mode for providing heated air to the passenger compartment 14. These modes can be selected automatically (e.g., by a computerized controller of a known type) or can be selected manually using user controls 20 (e.g., buttons, knobs, etc.). The user controls 20 can include a temperature setting device, a fan speed control, a selector for selecting which area of the passenger compartment 14 to deliver heated/chilled/fresh air, etc.

As will be discussed, the climate control system 19 can be very efficient. As a result, fuel economy for the vehicle can be increased.

Figure 2:
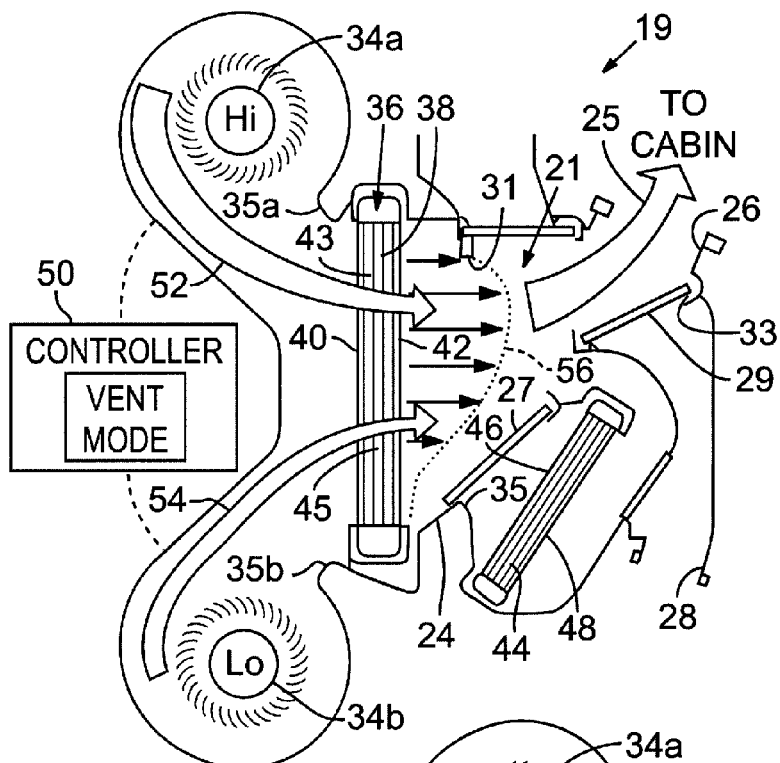
FIG. 2 is a schematic sectional view of a portion of the climate control system of FIG. 1 shown in a vent mode.
Figure 3:
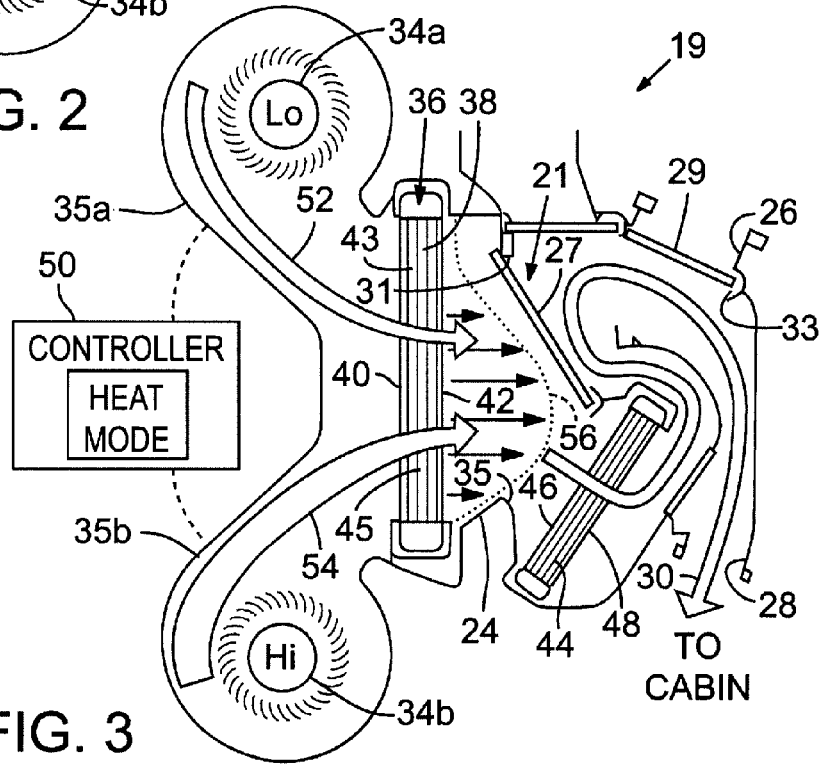
FIG. 3 is a schematic sectional view of a portion of the climate control system of FIG. 1 shown in a heat mode.
Figure 4:
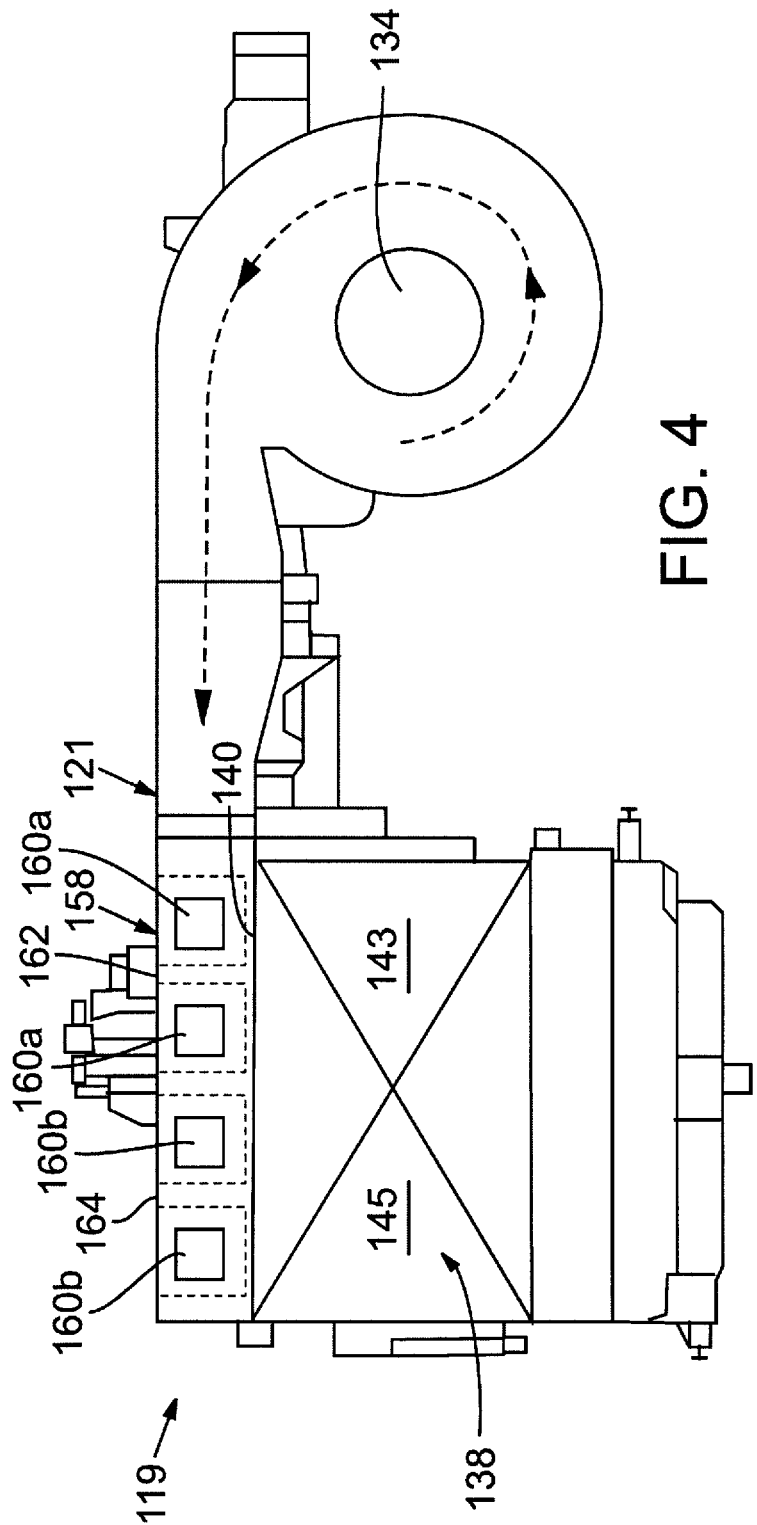
FIG. 4 is a schematic sectional view of the climate control system according to additional embodiments.

Referring now to FIGS. 2 and 3, the climate control system 19 will be discussed in greater detail. As noted above, the climate control system 19 is shown in VENT mode in FIG. 2 and in HEAT mode in FIG. 3.

The ducting assembly 21 is shown in greater detail. As shown, the ducting assembly 21 can include a common plenum 24, a vent inlet 31, a vent outlet 26, a heat inlet 35, a heat opening 33, and a heat outlet 28. A "vent airflow path" (indicated by arrow 25 in FIG. 2) can be defined between the vent inlet 31 and the vent outlet 26. Also a "heat airflow path" (indicated by arrow 30 in FIG. 3) can be partially defined between the heat inlet 35, the heat opening 33, and the heat outlet 28. The airflow paths 25, 30 are distinct from each other. The vent and heat outlets 26, 28 can be in fluid communication with the air outlets 22 shown in FIG. 1 such that air can flow from the plenum 24, along either the vent or heat airflow paths 25, 30 and into the passenger compartment 14 of the vehicle 10.

The ducting assembly 21 can also include one or more directing members 27, 29 that change direction of the airflow between the vent and heat airflow paths 25, 30. The directing members 27, 29 can each be relatively flat panels or doors. For instance, the ducting assembly 21 can include a first directing member 27 that pivots between a first position (shown in FIG. 2) and a second position (shown in FIG. 3), and the ducting assembly 21 can also include a second directing member 29 that pivots between a first position (shown in FIG. 2) and a second position (shown in FIG. 3). In their respective first positions shown in FIG. 2, the first directing member 27 can substantially close off the heat inlet 35, and the second directing member 29 can substantially close off the heat opening 33. In contrast, in their respective second positions shown in FIG. 3, the first directing member 27 can substantially close off the vent inlet 31, and the second directing member 29 can substantially close off the vent outlet 26. Accordingly, air can flow along the vent airflow path 25 when the first and second directing members 27, 29 are in their first positions, and air can flow along the heat airflow path 30 when the first and second directing members 27, 29 are in their second positions.

It will be appreciated that the system 19 can include any suitable type and/or number of directing members 27, 29. It will also be appreciated that multiple directing members 27, 29, including those not shown, can cooperate to direct airflow through the system 19. Also, it will be appreciated that the system 19 can define any suitable number, shape, and/or configuration of passageways and/or airflow paths 25, 30.

The system 19 can additionally include a first blower 34a and a second blower 34b. The blowers 34a, 34b can be of any suitable type. The blowers 34a, 34b can be disposed within the ducting assembly 21. The blowers 34a, 34b can be spaced away from each other. The first blower 34a can blow air along a first airflow path 52 into the common plenum 24 via a first blower inlet 35a. The second blower 34b can blow air along a second airflow path 54 into the common plenum 24 via a second blower inlet 35b. It will be appreciated that the blowers 34a, 34b can draw air from either a fresh air inlet (not shown) to draw fresh air from outside the vehicle and/or the blowers 34a, 34b can draw air from a recirculation inlet (not shown) to draw recirculated air from the passenger compartment 14. It will also be appreciated that the blowers 34a, 34b can have various speeds or settings, such as a high setting in which the blowers 34a, 34b blow air at a high pressure and a low setting in which the blowers 34a, 34b blow air at a low pressure. The blowers 34a, 34b can have any suitable number of settings and speeds.

Moreover, the system 19 can include a cooling cycle (i.e., refrigeration cycle), which is generally indicated at 36. Of the cooling cycle 36, only the evaporator 38 is shown in FIGS. 2 and 3; however, it will be appreciated that the cooling cycle 36 can also include a condenser, a compressor, an expansion valve, as is known. Commercially available refrigerant can continuously flow through the cooling cycle 36, and the temperature and pressure of the refrigerant can change as it does so. Specifically, low temperature and low pressure refrigerant can flow (e.g., from an expansion valve) through the evaporator 38, and warmer air from the blowers 34a, 34b can flow across the evaporator 38 to be chilled before being introduced into the passenger compartment 14.

The evaporator 38 can include an upstream face 40 and a downstream face 42 that are opposite each other. Moreover, the evaporator 38 can include a first region 43 (first longitudinal region) and a second region 45 (second longitudinal region). In the embodiments illustrated, the first region 43 is disposed between the first blower inlet 35a and the vent inlet 31. The second region 45 is disposed between the second blower inlet 35b and the heat inlet 35.

In some embodiments, the vehicle 10 can include only one climate control system 19, and that system 19 can include only one cooling cycle 36 having a single evaporator 38 (as well as a single condenser, compressor, expansion valve, etc.). Regardless of the fact that the system 19 includes only a single cooling cycle 36, the system 19 can have sufficient cooling capacity for cooling vans, minivans, SUVs, and other large vehicles.

Moreover, the vehicle 10 can include a heater core 44 with an upstream face 46 and a downstream face 48. The heater core 44 can be of a known type of heat exchanger that is part of the engine cooling system. Refrigerant can flow between the heater core 44 and an engine (not shown). The refrigerant can be heated by the engine, and if air flows through along the heat airflow path 30, that air can be heated as it flows across the heater core 44.

Additionally, the system 19 can include a controller 50 that can control the blowers 34a, 34b, the position of the directing members 27, 29, and other components of the climate control system 19. The controller 50 can include a processor, a memory device (RAM and/or ROM), as well as other components of a computer. The controller 50 can also be in communication with the user controls 20 so that the user can input commands to the controller 50.

Thus, during operation, both of the first and second blowers 34a, 34b can operate in parallel to blow air across the same evaporator 38. Specifically, in the VENT mode shown in FIG. 2, the first blower 34a can blow air along the first airflow path 52, primarily across the first region 43 of the evaporator 38. The second blower 34b can blow air along the second airflow path 54, primarily across the second region 45 of the evaporator 38. If the evaporator 38 is operating, the air from both blowers 34a, 34b can be chilled and can both travel along the vent airflow path 25 to be delivered to the passenger compartment 14. If the evaporator is not operating, the air will not be chilled, but will still travel along the vent airflow path 25 to the passenger compartment 14. Also, during this VENT mode, the air bypasses the heater core 44.

In contrast, in the HEAT mode shown in FIG. 3, the first blower 34a can blow air along the first airflow path 52, primarily across the first region 43 of the evaporator 38. The second blower 34b can blow air along the second airflow path 54, primarily across the second region 45 of the evaporator 38.

Moreover, the controller 50 can vary the speeds (and, thus, the blowing output pressure) of the blowers 34a, 34b depending on whether the system 19 is in the VENT or HEAT mode. Specifically, the first blower 34a can blow at a "HI" speed and the second blower 34b can blow at a "LOW" speed when in the VENT mode as shown in FIG. 2. In contrast, the first blower 34a can blow at a "LOW" speed and the second blower 34b can blow at a "HI" speed when in the HEAT mode as shown in FIG. 3. Accordingly, by controlling the fan speed, a pressure distribution 56 of the blown air (defined along the downstream face 42 of the evaporator) can be varied depending on whether the system 19 is in the VENT or HEAT mode.

As shown in FIG. 2, the highest pressure air in the distribution 56 is located generally over the first region 43 of the evaporator 38 because the first blower 34a is blowing at a higher speed than the second blower 34b. This higher pressure air flowing along the first airflow path 52 from the first blower 34a is more directly aligned with the vent airflow path 25; therefore, air can be chilled and delivered to the passenger compartment 14 more efficiently (i.e., with less downstream pressure loss).

In contrast, as shown in FIG. 3, the highest pressure air in the distribution 56 is located generally over the second region 45 of the evaporator 38 because the second blower 34b is blowing at a higher speed than the first blower 34a. This higher pressure air flowing along the second airflow path 54 is more directly aligned with the heat airflow path 30; therefore, air can be heated and delivered to the passenger compartment 14 more efficiently (i.e., with less downstream pressure loss).

As a result, the air temperature within the passenger compartment 14 can be adjusted (heated or cooled) with high efficiency, despite only including one evaporator 38 and one heater core 44. Also, power consumption of the system 19 can be reduced, and the noise from the blowers 34a, 34b can be reduced as well.

Referring now to FIGS. 4-6B, additional embodiments of the climate control system 119 are illustrated. Components that correspond to those of the embodiments of FIGS. 2 and 3 are indicated by corresponding reference numbers increased by 100.

As shown, the system 119 includes only one blower 134. The system 119 also includes a single evaporator 138 with a first region 143 and a second region 145, similar to the embodiments of FIGS. 2 and 3.

The ducting system 121 can also include a rear wall 158 that faces the upstream face 140 of the evaporator 138. The rear wall 158 can be contoured to direct the airflow from the blower 134 toward the evaporator 138. The rear wall 158 can include a first portion 162 that corresponds in position to the first region 143 of the evaporator 138, and the rear wall 158 can also include a second portion 164 that corresponds in position to the second region 145 of the evaporator 138.

Moreover, as shown in FIGS. 5A-6B, the ducting assembly 121 of the system 119 can include one or more first blocking members 160a and one or more second blocking members 160b. As will be discussed, the blocking members 160a, 160b can selectively obstruct airflow between the wall 158 and the upstream face 140 of the evaporator 138 to thereby vary the pressure distribution 156 defined along the downstream face 142 of the evaporator 138.

Each blocking member 160a, 160b can be a flat plate. As shown in FIGS. 6A and 6B, the blocking members 160a, 160b can be pivotally mounted to a common support rod 161 and can be arranged in sequence along the longitudinal axis of the rod 161. Also, a first actuator 166a and a second actuator 166b can be included. A pivot rod 163a, 163b can attach the actuators 166a, 166b to the respective blocking members 160a, 160b. The actuator 166a can actuate the pivot rod 163a to rotate the blocking members 160a relative to the rod 161 between a first position and a second position. Likewise, the actuator 166b can actuate the pivot rod 163b to rotate the blocking members 160b relative to the rod 161 between a first position and a second position. The actuators 166a, 166b can each include an electrical motor or can be of any other type of actuator.

As shown in FIGS. 5A-6B, the first blocking members 160a are disposed between the first portion 162 of the wall 158 and the first region 143 of the evaporator 138. Likewise, the second blocking members 160b are disposed between the second portion 164 of the wall 158 and the second region 145 of the evaporator 138.

Also, the controller 150 can control movement of the blocking members 160a, 160b between their respective first and second positions to thereby vary the pressure distribution 156 of the air flowing downstream from the evaporator 138. Specifically, as shown in FIGS. 5A and 6A (i.e., VENT mode of the system 119), the first blocking members 160a can be in their second position to allow airflow across the first region 143 of the evaporator 138, and the second blocking members 160b can be in their first position to obstruct airflow across the second region 145 of the evaporator 138. Accordingly, air pressure from the first region 143 of the evaporator 138 can be higher than air pressure from the second region 145 as illustrated in FIG. 5A. In contrast, the first blocking members 160a can be in their first position (i.e., obstructing position) and the second blocking members 160b can be in their second position (i.e., unobstructing position) when in the HEAT mode shown in FIG. 5B. Accordingly, air pressure from the second region 145 of the evaporator 138 can be higher than air pressure from the first region 143 as illustrated in FIG. 5B. Thus, similar to the embodiments of FIGS. 2 and 3, the system 119 of FIGS. 5A-6B can have high efficiency because the pressure distribution 156 can be varied to align with the different airflow paths available in the VENT and HEAT modes.

Figure 7:
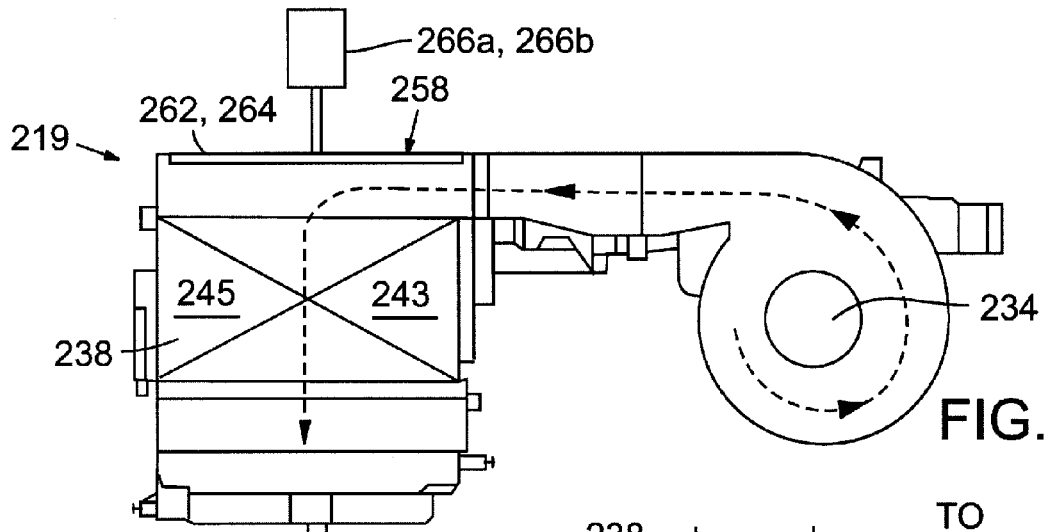
FIG. 7 is a schematic top view of the climate control system according to additional embodiments.
Figure 8A:
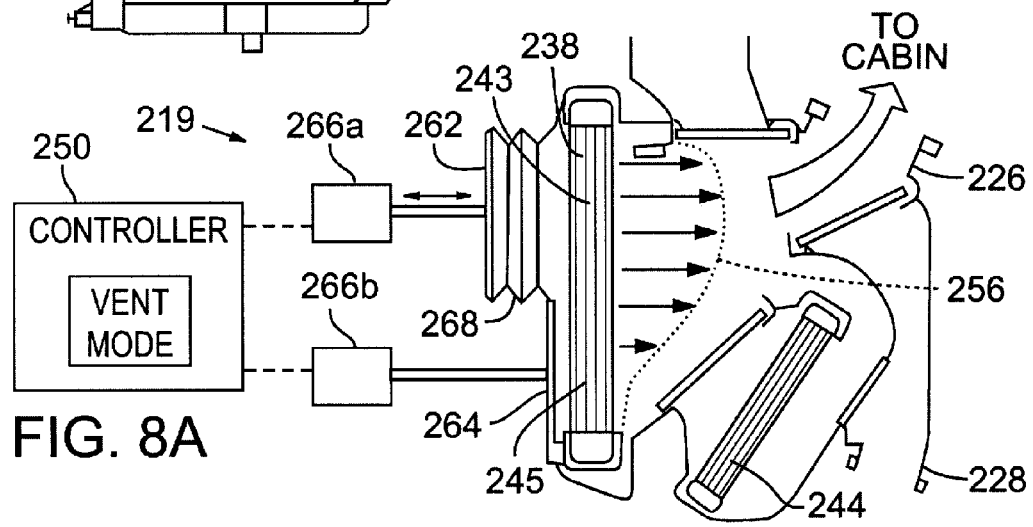
FIG. 8A is a schematic sectional view of the climate control system of FIG. 7 shown in a vent mode.
Figure 8B:
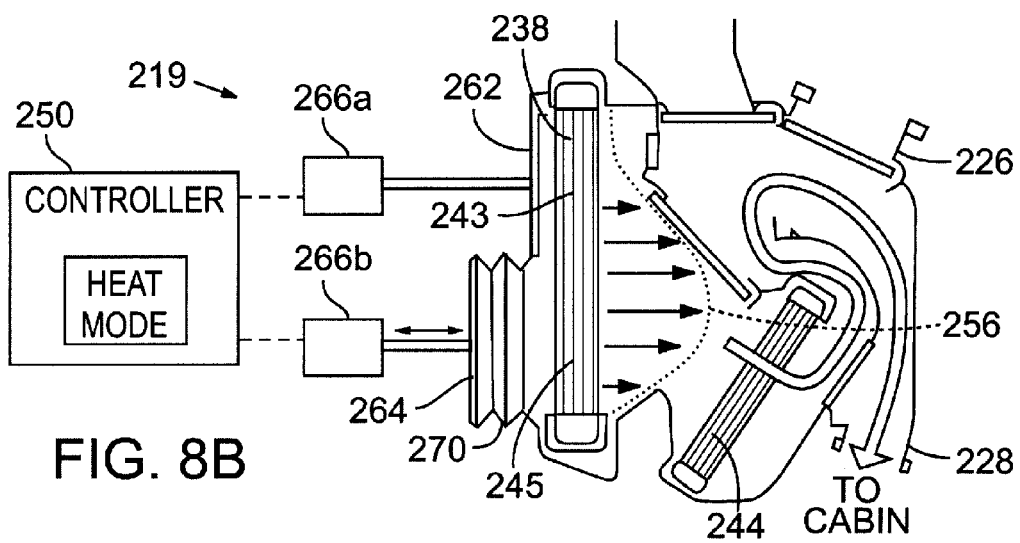
FIG. 8B is a schematic sectional view of the climate control system of FIG. 7 shown in a heat mode.

Referring now to FIGS. 7-8B, additional embodiments of the climate control system 219 are illustrated. Components that correspond to the embodiments of FIGS. 5A-6B are indicated by corresponding reference numbers increased by 100.

As shown, the wall 258 can include a first portion 262 and a second portion 264. Distance between the evaporator 238 and the first and second portions 262, 264 can be varied in order to vary the pressure distribution 256.

Specifically, the first portion 262 and second portion 264 can be moveable relative to each other and relative to the evaporator 238. For instance, the first portion 262 can include a collapsible bellows structure 268 and a first actuator 266a (e.g., linear actuator) that can selectively actuate the bellows structure 268 toward and away from the first region 243 of the evaporator 238. The second portion 264 can include a collapsible bellows structure 270 and a second actuator 266b (e.g., linear actuator) that can selectively actuate the bellows structure 270 toward and away from the second region 245 of the evaporator 238.

In the VENT mode of FIG. 8A, the distance (first distance) between the first portion 262 of the wall 258 and the evaporator 238 is greater than the distance (second distance) between the second portion 264 and the evaporator 238. In the HEAT mode of FIG. 8B, the distance (second distance) between the second portion 264 of the wall 258 and the evaporator 238 is greater than the distance (first distance) between the first portion 262 and the evaporator 238.

Accordingly, more air blows across the first region 243 of the evaporator 238 than the second region 245 in the VENT mode, thus resulting in a higher pressure distribution 256 adjacent the first region 243. In other words, a significant portion of the air is directed by the second portion 264 into the space between the first portion 262 and the evaporator 238 to thereby increase air pressure flowing across the first region 243 of the evaporator 238.

In contrast, more air blows across the second region 245 of the evaporator 238 than the first region 243 in the HEAT mode, thus resulting in a higher pressure distribution 256 adjacent the second region 245. In other words, a significant portion of the air is directed by the first portion 262 into the space between the second portion 264 and the evaporator 238 to thereby increase air pressure flowing across the second region 245 of the evaporator 238.

Thus, like the embodiments discussed above, the system 219 can provide relatively high efficiency. This can result in low power consumption and fuel savings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. It will also be appreciated that any of the features of the different embodiments discussed above can be combined and rearranged.

What is claimed is:

1. A climate control system for a vehicle having a plurality of modes, the climate control system comprising:
   an evaporator having a downstream face;
   a first blower generating a first airflow through a first region of the evaporator;
   a second blower generating a second airflow through a second region of the evaporator; wherein
   airflow downstream of the evaporator has a pressure distribution defined generally along the downstream face of the evaporator;
   the pressure distribution along the downstream face being variable depending on which of the plurality of modes the climate control system is currently set;
   the pressure distribution being created by combining the first airflow and the second airflow;
   the pressure distribution being controlled by varying a speed of the first blower and by varying a speed of the second blower, the speed of the first blower being different than the speed of the second blower;
   a heater core and a ducting assembly, the ducting assembly defining a first airflow path and a second airflow path, the first region of the evaporator disposed generally within the first airflow path, the second region of the evaporator disposed generally within the second airflow path, the heater core disposed in the second airflow path and the first airflow path bypassing the heater core, wherein the climate control system has a heat mode and a vent mode, wherein the pressure distribution extends across both the first and second airflow paths, wherein pressure is generally higher within the first airflow path than the second airflow path in the vent mode, and wherein pressure is generally higher within the second airflow path than the first airflow path in the heat mode; and
   a controller operable to control the first and second blowers such that blowing output from the first blower is greater than that of the second blower in the vent mode, the controller operable to control the first and second blowers such that blowing output from the second blower is greater than that of the first blower in the heat mode.

2. The climate control system of claim 1, wherein the ducting assembly includes at least one directing member having a first position and a second position, the directing member changing direction of airflow between the first and second airflow paths when moving between the first and second positions.

3. A method of operating a climate control system having a plurality of modes comprising:
   blowing air from a first blower to generate a first airflow through a first region of an evaporator;
   blowing air from a second blower to generate a second airflow through a second region of the evaporator;
   defining a pressure distribution of air generally along downstream face of the evaporator;
   varying the pressure distribution along the downstream face depending on which of the plurality of modes the climate control system is currently set; and
   combining the first airflow and the second airflow to create the pressure distribution;
   controlling the pressure distribution by varying a speed of the first blower and by varying a speed of the second blower, the speed of the first blower being different than the speed of the second blower; and
   providing a heater core and a ducting assembly, the ducting assembly defining a first airflow path and a second airflow path, the first region of the evaporator disposed generally within the first airflow path, the second region of the evaporator disposed generally within the second airflow path, the heater core disposed in the second airflow path and the first airflow path bypassing the heater core, wherein the climate control system has a heat mode and a vent mode, wherein the pressure distribution extends across both the first and second airflow paths, and wherein varying the pressure distribution includes causing pressure to be generally higher within the first airflow path than the second airflow path in the vent mode and causing pressure to be generally higher within the second airflow path than the first airflow path in the heat mode.

4. The method of claim 3, further comprising providing a directing member, and further comprising changing direction of airflow between the first and second airflow paths by moving the directing member between first and second positions.

5. The method of claim 3, the second blower blowing air generally toward the second region of the evaporator, further comprising controlling the first and second blowers such that blowing output from the first blower is greater than that of the second blower in the vent mode, and further comprising controlling the first and second blowers such that blowing output from the second blower is greater than that of the first blower in the heat mode.

6. A climate control system for a vehicle having a vent mode and a heat mode comprising:
   a ducting assembly defining a first airflow path and a second airflow path, each of the first and second airflow paths feeding into a passenger cabin of the vehicle;
   an evaporator having an upstream face, a downstream face, a first longitudinal region that is disposed generally in the first airflow path, and a second longitudinal region that is disposed generally in the second airflow path;
   a heater core disposed generally within the second airflow path, the first airflow path bypassing the heater core;
   a first blower blowing air through a first region of the evaporator from the upstream face to the downstream face to flow through the first airflow path;
   a second blower blowing air across a second region of the evaporator from the upstream face to the downstream face to flow through the second airflow path, the air downstream of the evaporator having a pressure distribution defined generally along the downstream face; and
   a controller that controls at least one of the ducting assembly and the at least one of the first and second blowers to vary the pressure distribution along the downstream face, depending on which of the plurality of modes the climate control system is currently set;
   the pressure distribution being created by combining the first airflow and the second airflow;
   the pressure distribution being controlled by varying a speed of the first blower and by varying a speed of the second blower, the speed of the first blower being different than the speed of the second blower; and
   a controller operable to control the first and second blowers such that blowing output from the first blower is greater than that of the second blower in the vent mode, the controller operable to control the first and second blowers such that blowing output from the second blower is greater than that of the first blower in the heat mode.

7. A climate control system for a vehicle having a plurality of modes, the climate control system comprising:
   an evaporator having a downstream face;
   a first blower blowing air through a first region of the evaporator from the upstream face to the downstream face to flow through the first airflow path;
   a second blower blowing air across a second region of the evaporator from the upstream face to the downstream face to flow through the second airflow path, the air downstream of the blower having a pressure distribution defined generally along the downstream face;
   means for varying the pressure distribution along the downstream face depending on which of the plurality of modes the climate control system is currently set; and
   the pressure distribution being created by combining the first airflow and the second airflow;
   the pressure distribution being controlled by varying a speed of the first blower and by varying a speed of the second blower, the speed of the first blower being different than the speed of the second blower; and
   a controller operable to control the first and second blowers such that blowing output from the first blower is greater than that of the second blower in a vent mode, the controller operable to control the first and second blowers such that blowing output from the second blower is greater than that of the first blower in a heat mode.

* * * * *